United States Patent [19]

Ryoke et al.

[11] Patent Number: 4,868,060
[45] Date of Patent: Sep. 19, 1989

[54] MAGNETIC RECORDING MEDIUM

[75] Inventors: Katsumi Ryoke; Toshimitu Okutu; Masatoshi Takahashi; Yasuyuki Yamada, all of Kanagawa, Japan

[73] Assignee: Fuji Photo Film Co., Ltd., Kanagawa, Japan

[21] Appl. No.: 38,172

[22] Filed: Apr. 14, 1987

[30] Foreign Application Priority Data

Apr. 14, 1986 [JP] Japan ................................. 61-84276

[51] Int. Cl.$^4$ ............................................. G11B 5/74
[52] U.S. Cl. .................................. 428/422.8; 428/694; 428/900
[58] Field of Search ............... 427/131, 132; 428/695, 428/422.8, 694, 900

[56] References Cited

U.S. PATENT DOCUMENTS

| | | | |
|---|---|---|---|
| 3,206,352 | 9/1965 | Gollis | 428/422.8 |
| 3,980,594 | 9/1976 | Fabris | 428/422.8 |
| 4,587,170 | 5/1986 | Hanai | 428/900 |
| 4,596,739 | 6/1986 | Piltingsrud | 428/425.9 |
| 4,621,027 | 11/1986 | Okita | 428/900 |
| 4,632,878 | 12/1986 | Okita | 428/900 |

FOREIGN PATENT DOCUMENTS 32113 2/1985 Japan .

*Primary Examiner*—Paul J. Thibodeau
*Attorney, Agent, or Firm*—Sughrue, Mion, Zinn, Macpeak & Seas

[57] ABSTRACT

A magnetic recording medium is described, comprising a non-magnetic support having provided thereon a magnetic layer containing ferromagnetic particles and a binder, said binder of the magnetic layer containing polyisocyanato-isocyanurate as a hardening component.

8 Claims, No Drawings

MAGNETIC RECORDING MEDIUM

FIELD OF THE INVENTION

The present invention relates to a magnetic recording medium, and more particularly it relates to a magnetic recording medium preventing the occurrence of dropouts.

BACKGROUND OF THE INVENTION

Magnetic recording media comprising a non-magnetic support having provided thereon a magnetic layer containing ferromagnetic particles and a binder are now widely used for magnetic recording and reproducing.

When the above-described magnetic recording media are used, for example, as a video tape, dropouts generally occur. The reason is believed to be due to wear and scratches of a magnetic layer occurring from inside of the magnetic recording medium itself and due to attachment of, for example, dust and contaminants on the magnetic layer occurring from the outside of the magnetic recording medium.

As means to solve the former problem, running stability of a tape is increased by adding abrasive agents into a magnetic layer or film strength of a magnetic layer is increased by raising the glass transition temperature Tg of the binder of the magnetic layer, as described in U.S. Pat. Nos. 3,630,910 and 3,833,412.

On the other hand, as means to solve the latter problem, surface electrical resistance Rs of the magnetic recording medium is decreased by adding carbon black and electroconductive polymer into the magnetic layer, as described, for example, in Japanese Patent Publication No. 28648/72 and U.S. Pat. No. 4,539,257, since the latter problem is believed to be caused by the charging of the magnetic recording medium, that is, a tape is charged as a result of friction between layers of the tape or between the tape and foreign substances, and the resulting static charging induces dust and contaminants floating in the air.

However, the above means to prevent wear of a magnetic recording medium is not fully sufficient. Dropouts caused by scratches generated upon running a tape still occur. As means to prevent dust and contaminants from attaching on the magnetic recording medium, electroconductive substances such as carbon black are added to a magnetic layer to increase electroconductivity of the magnetic recording medium (or to decrease surface electric resistance) and to let the charged electric charge go. However, such means to prevent static electrical charging is also not fully sufficient. There is also an additional problem. That is, when a filler such as carbon black which is used to increase electroconductivity is used in a large amount, not only does runnability of a tape deteriorate, but the packing density of ferromagnetic particles also decreases, with the result that recording and reproducing characteristics become poor. When an abrasive agent is added to a magnetic layer to increase running stability, the same problem as above also occurs.

SUMMARY OF THE INVENTION

An object of the present invention is to provide means to effectively prevent from occurrence of dropouts caused by scratches, wear out, and charging caused by friction, without being accompanied with the above-described defects.

Another object of the present invention is to provide a magnetic recording medium effectively resistant to occurrence of dropouts as above.

As a result of extensive research, the inventors of the present invention have found that the above-described objects can be attained by using polyisocyanato-isocyanurate as a part of a binder used in a magnetic layer, and the present invention has been achieved based on this discovery.

That is, the present invention is directed to a magnetic recording medium comprising a non-magnetic support having provided thereon a magnetic layer containing ferromagnetic particles and a binder, the binder of the said magnetic layer containing polyisocyanato-isocyanurate as a hardening component.

DETAILED DESCRIPTION OF THE INVENTION

Polyisocyanato-isocyanurates (1,3,5-substituted-perhydro-1,3,5-triazine-2,4,6-trione) and derivatives thereof used in the present invention are represented by formula (1) or (2).

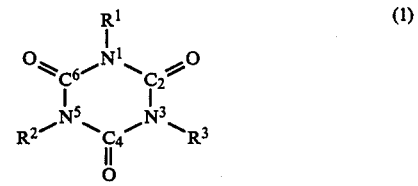

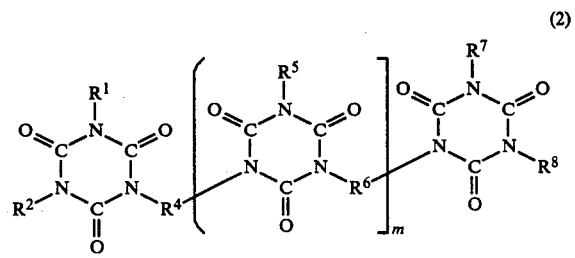

In the above formulae, $R^1$, $R^2$, $R^3$, $R^5$, $R^7$, and $R^8$ each represents

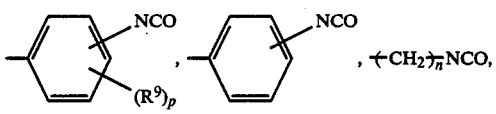

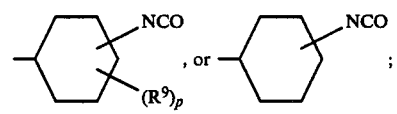

$R^4$ and $R^6$ each represents

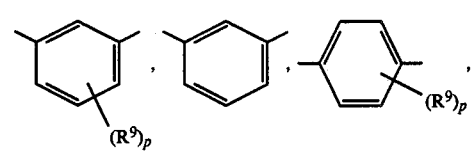

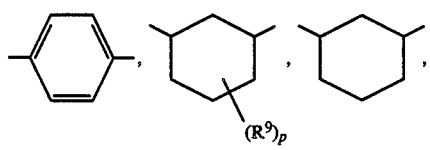

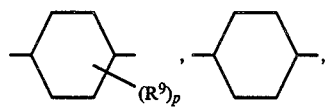

—$C_lH_{2l}$, or a divalent group derived from isophorone; $R^9$ represents a methyl group or an ethyl group; m is 0 or an integer of from 1 to 5 (preferably from 0 to 3); n is an integer of from 1 to 10 (preferably from 1 to 6); l is an integer of from 1 to 10 (preferably from 1 to 6); and p is an integer of from 1 to 10. It is preferred that $R^4$ and $R^6$ represent

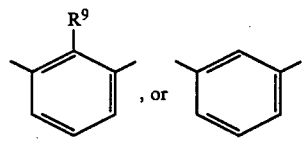

Of these polyisocyanato-isocyanurates, those represented by formula (1) or (2) wherein m is 0 are particular preferred.

The above compounds are commercially available under various trademarks. For example, isocyanurate of isophorone diisocyanate having the following formula (A) is commercially available under the trademarks of IPDI-T1890S, IPDI-T1890M, and IPDI-T1890, manufactured by Hüls company.

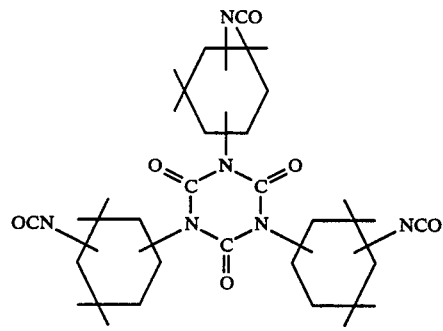

(A)

The condensed compounds of the above iso-cyanurate having, for example, the following formulase (B) and (C), are commercially available under the trademarks Collonate 2030, 2031 (manufactured by Nippon Polyurethane Co., Ltd.); Sprasec 3240, 3340 (manufactured by Nippon Polyurethane Co., Ltd., and ICI Co., Ltd.); Takenate D200, D202 (manufactured by Takeda Chemical Industries, Ltd.); and Sumidule FL, Desmodule IL, Desmodule HL, Desmodule FL (Sumitomo Bayer Co., Ltd.).

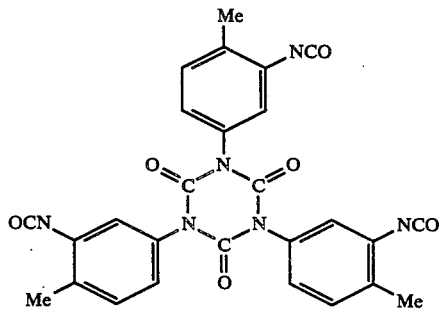

(Sumidule FL)

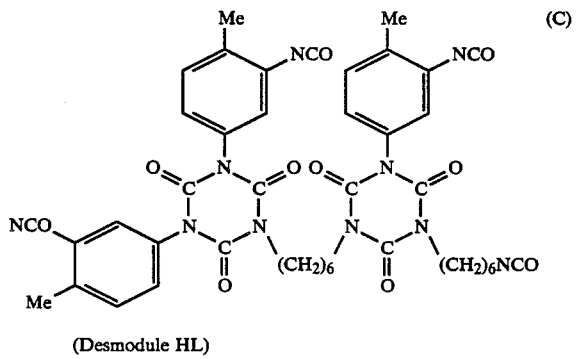

(Desmodule HL)

The compounds having the following formula (D) are commercially available under the trademark of Collonate EH manufactured by Nippon Polyurethane Co., Ltd.

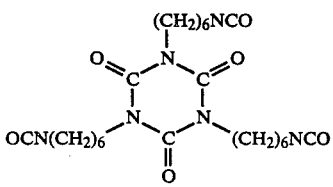

(D)

In the present invention, the binder is used in an amount of from about 5 to 200 parts by weight per 100 parts by weight of ferromagnetic particles as hereinafter referred to, and the above-described polyisocyanato-isocyanurate is preferably used in an amount of from 1 to 50 wt %, and more preferably from 5 to 40 wt %, based on the total amount of binder.

Thus, by using polyisocyanato-isocyanurate as a part of a binder for a magnetic layer, not only can occurrences of scratches and wearing out of a magnetic layer be prevented, but also the electric charging property caused by friction of a magnetic recording medium can be reduced, and generation of static electric charge can be prevented, with the result that occurrences of dropouts can be prevented. Also in the present invention, since polyisocyanato-isocyanurate is used as a part of a binder, there is no problem as to deterioration of runnability and decrease of packing density which occurs when a conventional filler is used.

When polyisocyanato-isocyanurate of the present invention is used together with conventional carbon black, the antistatic effect can be increased as well as increasing the electroconductive property. The carbon black is generally added in an amount of from 1 to 20 parts by weight, preferably from 2 to 8 parts by weight, per 100 parts by weight of ferromagnetic particles. The particle size of carbon black which can be used for the purpose is generally from 5 to 100 millimicrons and preferably from 10 to 50 millimicrons. Such carbon black is commercially available under the trademarks Asahi #80, Asahi #70, Asahi #60 (manufactured by Asahi Carbon Co., Ltd.); Conductex SC (manufactured by Columbian Carbon Co.); and VULCAN XC-72, BP-2000, BP-800 (manufactured by Cabot Co., Ltd.).

Ferromagnetic particles used in the present invention are not particularly limited. Ferromagnetic alloy particles, $\gamma$-$Fe_2O_3$, $Fe_3O_4$, Co-modified iron oxide, modified barium ferrite, and modified strontium ferrite can be used.

Regarding ferromagnetic alloy particles, ferromagnetic alloy particles have a metal content of 75 wt % or more and at least 80 wt % of the metal content is a ferromagnetic metal or an alloy (e.g., Fe, Co, Ni, Fe—Co, Fe—Ni, Co—Ni, Co—Ni—Fe) and 20 wt % or less of the metal content in an alloy can be other elements (e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, and P). The above-described ferromagnetic metal can contain a small amount of water, hydroxides, or oxides. A method for preparing these ferromagnetic metal particles is already known and ferromagnetic alloy particles, which are typical examples of ferromagnetic particles of the present invention can be prepared in accordance with the conventional method.

Methods for preparing ferromagnetic alloy particles include, for example, the following.

(a) A method involving reducing composite organic acid salt (mainly oxalic salt) with a reducing gas such as hydrogen (b) A method involving reducing iron oxide with a reducing gas such as hydrogen to obtain Fe or Fe—Co particles (c) A method involving heat-decomposing metal carbonyl compound (d) A method involving reducing by addition of a reducing agent such as sodium boron hydride, hypophosphite, or hydrazine into an aqueous solution of ferromagnetic metal (e) A method involving electrodepositing ferromagnetic metal particles using a mercury cathode and then separating them from mercury (f) A method involving evaporating metal in an inactive gas under low pressure to obtain fine particles When ferromagnetic alloy particles are used, the shape thereof is not particularly limited, but generally an acicular shape, a dice shape, a rice grain shape, and a tabular shape can be used.

The binder used in the present invention can include conventionally known thermoplastic resins, thermosetting resins, reactive type resins, and the mixture thereof.

The thermoplastic resins are those having a softening point of 150° C. or lower, having an average molecular weight of from 10,000 to 200,000, and a degree of polymerization of from about 200 to 2,000 such as a copolymer of vinyl chloride and vinyl acetate, a copolymer of vinyl chloride, vinyl acetate and maleic acid, a copolymer of vinyl chloride and vinylidene chloride, a copolymer of vinyl chloride and acrylonitrile, a copolymer of acrylate and acrylonitrile, a copolymer of acrylate and vinylidene chloride, a copolymer of acrylate and styrene, a copolymer of methacrylate and acrylonitrile, a copolymer of methacrylate and vinylidene chloride, a copolymer of methacrylate and styrene, urethane elastomer, polyvinyl fluoride, a copolymer of vinylidene chloride and acrylonitrile, a copolymer of butadiene and acrylonitrile, a polyamide resin, polyvinyl butyral, cellulose derivatives (e.g., cellulose acetate butyrate, cellulose diacetate, cellulose triacetate, cellulose propionate, nitrocellulose, etc.), a copolymer of styrene and butadiene, a polyester resin, various synthetic rubbers (e.g., chloroprene, polyisoprene, etc.) and the mixture thereof.

The thermosetting resins or reactive type resins are those having a molecular weight of 200,000 or less when they are in a coating composition, and the molecular weight thereof becomes infinite by condensation reaction or addition reaction when they are added after coating and drying the coating composition. Among these, resins that do not soften nor melt until those resins are heat-decomposed are preferred. The specific examples are, for example, a phenoxy resin, a phenol-formalin novolac resin, a phenol-formalin resorl resin, a phenol-fulfural resin, a xyleneformaldehyde resin, a urea resin, a melamine resin, a dry oil-modified alkyd resin, a phenolic acid resin-modified alkyd resin, a maleic acid resin modified alkyd resin, an unsaturated polyester resin, an epoxy resin and its hardening agent (e.g., polyamine, an acid anhydride, a polyamide resin, etc.), a moisture hardenable type resin having isocyanate polyester at the terminal, a moisture hardenable type resin having isocyanate polyether at the terminal, polyisocyanate prepolymer (e.g., a compound having at least three isocyanate groups in a molecule, which is obtained by the reaction of diisocyanate and a low molecular weight triol, trimer and tetramer of diisocyanate, etc.), polyisocyanate prepolymer and a resin having an active hydrogen (polyester polyols, polyether polyols, an acrylate copolymer, a maleic acid copolymer, a 2-hydroxyethyl methacrylate copolymer, a parahydroxystyrene copolymer, etc.), and the mixture thereof.

Of these binders, a copolymer of vinyl chloride and vinyl acetate, a polyurethane resin, a phenoxy resin and an epoxyl resin are preferably used in combination with the polyisocyanato--isocyanurate of the present invention.

These binders can be used alone or in combination. And other additives can be used. The binders are generally used in an amount of from 5 to 200 parts by weight, and preferably from 10 to 150 parts by weight, per 100 parts by weight of ferromagnetic particles (e.g., ferromagnetic alloy particles or hexagonal crystalline ferrite type magnetic particles).

The organic solvents used upon mixing and kneading include ketones such as acetone, methyl ethyl ketone, methyl isobutyl ketone, or cyclohexanone; alcohols such as methanol, ethanol, propanol, or butanol; esters such as methyl acetate, ethyl acetate, butyl acetate, ethyl lactate, or monoethyl ether of glycol acetate; glycol ethers such as ether, glycol dimethyl ether, glycol monoethyl ether, or dioxane; tars (aromatic hydrocarbons) such as benzene, toluene, or xylene; and chlorinated hydrocarbons such as methylene chloride, ethylene chloride, carbon tetrachloride, chloroform, ethylene chlorohydrin, or dichlorobenzene.

In the present invention, additives generally used for a magnetic layer such as a dispersing agent, an antistatic agent, a lubricating agent, and an abrasive agent can be added to the magnetic coating composition, and such a magnetic coating composition is coated on a non-magnetic support.

The non-magnetic supports used in the present invention include plastic films (e.g., polyesters such as polyethylene terephthalate or polyethylene-2,6-naphthalate; polyolefins such as polypropylene; cellulose derivatives such as cellulose triacetate or cellulose diacetate; and polycarbonate). The thickness of the support is generally from 3 to 100 microns, and preferably from 4 to 50 microns.

The methods for coating include a doctor coating, a blade coating, a squeeze coating, and a reverse roller coating.

In accordance with the present invention, the magnetic coating composition having the above-described components is coated on a support, subjected to orientation, dried, and, if desired, subjected to heat treatment and surface treatment, to prepare a magnetic layer. In this invention, polyisocyanato-isocyanurate of the present invention is added together with the above-described binders into the magnetic coating composition and then the magnetic coating composition is coated on a support to form a magnetic layer. The dry thickness of the magnetic layer is generally from 2 to 10 microns and preferably from 3 to 6 microns.

In the present invention, a backing layer can be provided on the surface of the support opposite to the magnetic layer. In this case, the above-described polyisocyanato-isocyanurate can be incorporated into the backing layer as a part of a binder and can be incorporated into both of the backing layer and the magnetic layer. The backing layer is provided to increase running stability and antistatic property, as generally conducted. In such a backing layer, additives such as an abrasive agent or carbon black are dispersed in a binder which is similar to the binder used in the magnetic layer.

The present invention is illustrated is more detail by the following examples. In the examples, all parts are by weight.

EXAMPLE 1

The following compositions were put in a ball mill and sufficiently mixed and kneaded. Into the mixture was added polyisocyanate (the amount thereof is shown in Table below), which was then uniformly mixed and dispersed to prepare a magnetic coating composition.

| | |
|---|---|
| Co-containing $\gamma$-Fe$_2$O$_3$ particles (nitrogen absorption specific surface area: 40 m$^2$/g) (particle Hc = 850 Oe) | 300 parts |
| Vinyl chloride-vinyl acetate copolymer (VMCH, manufactured by Union Carbide Co., Ltd.) | 20 parts |
| Polyurethane (RV-830, manufactured by Toyobo Co., Ltd.) | 40 parts |
| Carbon black (average particle size: 20 millimicrons) | 10 parts |
| Octyl laurate | 2 parts |
| Lauric acid | 2 parts |
| Butyl acetate | 500 parts |
| Methyl ethyl ketone | 300 parts |
| Cyclohexanone | 100 parts |

The viscosity of the magnetic coating composition was adjusted and the coating composition was coated on a polyethylene terephthalate base, subjected to orientation and dried to prepare a sample.

As described hereinbefore, polyisocyanate is conventionally used as a binder. Samples where commercially available polyisocyanate was used are identified as comparative sample Nos. 1 to 18 and samples where polyisocyanato-isocyanurate of the present invention was employed were identified as sample Nos. 19 to 27.

The thus prepared samples were subjected to measurements with respect to dropout, scratch, and charging, and the results are shown in Table below.

TABLE

| Sample No. | Compound | Part | Number of Dropout[8] initial value | Number of Dropout[8] after 100 passes | Scratch[9] | Charge on tape path |
|---|---|---|---|---|---|---|
| 1 | Millionate MTL [1] | 10 | 7 | 13 | 7 | —[7] |
| 2 | " | 30 | 6 | 11 | 9 | −8 V |
| 3 | " | 50 | 6 | 14 | 2 | — |
| 4 | Millionate MR 400[2] | 10 | 7 | 18 | 5 | — |
| 5 | " | 30 | 9 | 11 | 5 | −12 V |
| 6 | " | 50 | 4 | 31 | 4 | — |
| 7 | Sumidule L75[3] | 10 | 5 | 11 | 6 | — |
| 8 | " | 30 | 8 | 18 | 5 | −8 V |
| 9 | " | 50 | 3 | 10 | 3 | — |
| 10 | Takenate D110N[4] | 10 | 0 | 15 | 9 | — |
| 11 | " | 30 | 9 | 16 | 3 | −6 V |
| 12 | " | 50 | 2 | 14 | 4 | — |
| 13 | Sumidule N-75[5] | 10 | 2 | 15 | 7 | — |
| 14 | " | 30 | 7 | 18 | 1 | −6 V |
| 15 | " | 50 | 5 | 18 | 4 | — |
| 16 | Collonate HL[6] | 10 | 4 | 10 | 5 | — |
| 17 | " | 30 | 2 | 14 | 3 | −6 V |
| 18 | " | 50 | 7 | 11 | 3 | — |
| 19 | Sumidule FL Formula (B) | 10 | 8 | 6 | 0 | — |
| 20 | " | 30 | 7 | 5 | 0 | −1 V |
| 21 | " | 50 | 5 | 5 | 0 | — |
| 22 | Desmodule HL Formula (C) | 10 | 1 | 2 | 0 | — |

TABLE-continued

| Sample No. | Compound | Part | Number of Dropout*8 initial value | Number of Dropout*8 after 100 passes | Scratch*9 | Charge on tape path |
|---|---|---|---|---|---|---|
| 23 | " | 30 | 3 | 3 | 0 | 0 V |
| 24 | " | 50 | 1 | 4 | 0 | — |
| 25 | Collonate EH Formula (D) | 10 | 9 | 6 | 0 | — |
| 26 | " | 30 | 6 | 5 | 0 | +3 V |
| 27 | " | 50 | 4 | 5 | 0 | — |

(Notes)
*1Millionate MTL (a carbodiimide-modified m-phenylene diisocyanate; manufactured by Nippon Polyurethane Co., Ltd.)
*2Millionate MR400 (a polymethylene polyphenylene polyisocyanate; manufactured by Nippon Polyurethane Co., Ltd.)
*3Sumidule L75 (an alcohol adduct of tolylene diisocyanate; manufactured by Sumitomo Bayer Co., Ltd.)
*4Takenate D110N (a xylylene diisocyanate type polyisocyanate; manufactured by Takeda Chemical Industries, Ltd.)
*5Sumidule N-75 (manufactured by Sumitomo Bayer Co., Ltd.)
*6Collonate HL (a hexamethylenediisocyanate type polyisocyanate; manufactured by Nippon Polyurethane Co., Ltd.)
*7not measured
*8Dropouts where reproduced output level was decreased by 16 dB or more for 5 microseconds were counted by a dropout counter.
*9The number of scratches on a magnetic layer of a tape which made running for 100 passes with double load, that is, 400 g, was counted by a microscope ($\times 50$).

It is clear from the above results that magnetic recording media using polyisocyanato-isocyanurate of the present invention in a magnetic layer as a hardening component of a binder exhibit less charging when on a tape path for a magnetic tape, significantly fewer occurrences of dropouts, and little or no scratches, as compared with a magnetic recording medium using conventional polyisocyanate.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having provided hereon a magnetic layer containing ferromagnetic particles and a binder, said binder of the magnetic layer containing polyisocyanato-isocyanurato as a hardening component wherein the content of polyisocyanato-isocyanurate is from 1 to 50 wt % based on the total amount of binder wherein said polyisocyanato-isocyanurate is represented by formula (2)

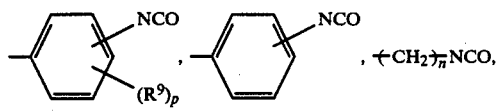

where $R^1$, $R^2$, $R^5$, $R^7$, and $R^8$ each represents

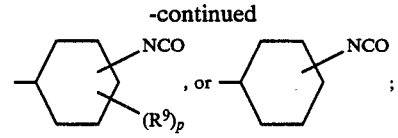

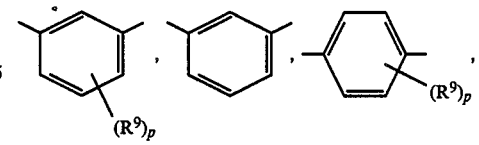

$R^4$ and $R^6$ each represents

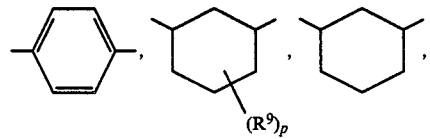

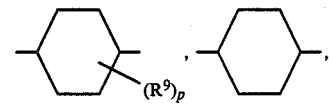

$-C_lH_{2l}$, or a or a divalent group derived from iosphorone; $R^9$ represents a methyl group or an ethyl group; m is 0 or an integer of from 1 to 5; n is an integer of from 1 to 10; l is an integer of from 1 to 10; and p is an integer from 1 to 10.

2. A magnetic recording medium as in claim 1, wherein the content of polyisocyanato-isocyanurate is from 5 to 40 wt % based on the total amount of binder.

3. A magnetic recording medium as in claim 1, wherein said binder is present in an amount of from about 5 to 200 parts by weight per 100 parts by weight of ferromagnetic particles.

4. A magnetic recording medium as in claim 1, wherein the ferromagnetic particles are ferromagnetic alloy particles or hexagonal crystalline ferrite magnetic particles, and said binder is present in an amount of from 10 to 150 parts by weight per 100 parts by weight of said particles.

5. A magnetic recording medium as in claim 3, wherein said binder is present in an amount of from about 5 to 200 parts by weight per 100 parts by weight of ferromagnetic particles.

6. A magnetic recording medium as in claim 3, wherein the ferromagnetic particles are ferromagnetic alloy particles or hexagonal crystalline ferrite magnetic particles, and said binder is present in an amount of from 10 to 150 parts by weight per 100 parts by weight of said particles.

7. A magnetic recording medium as in claim 1, wherein said magnetic layer contains carbon black.

8. A magnetic recording medium as in claim 1, wherein the amount of the polyisocyanato-isocyanurate is from about 3 to about 17 parts by weight per 100 parts by weight of the ferromagnetic particles.

* * * * *